March 11, 1930.  M. J. FRAMBACH  1,750,098
NONSKID DEVICE
Filed July 28, 1927
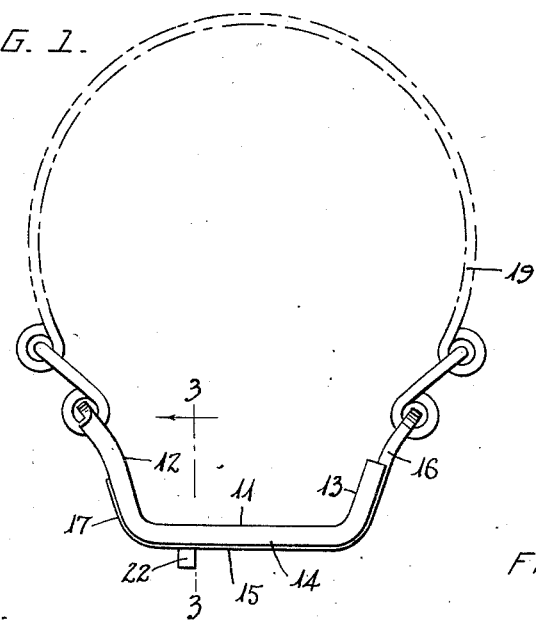
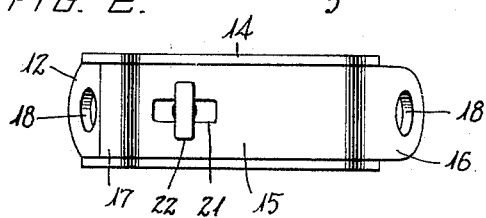
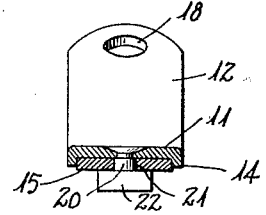

Patented Mar. 11, 1930

1,750,098

UNITED STATES PATENT OFFICE

MATHEW J. FRAMBACH, OF HARTLEY, IOWA

NONSKID DEVICE

Application filed July 28, 1927. Serial No. 209,075.

The present invention relates to non-skid devices for automobile and other vehicle wheels, and aims to provide a simple device which may be conveniently applied and fastened around the felly and tire.

Another object is the provision of a novel saddle to straddle the felly of a wheel and comprising two parts detachably fitted and fastened together in a novel manner for holding a tread chain or member that extends across the tread of the tire.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is an edge view of the device, showing the tread member in broken lines.

Fig. 2 is an inside view of the saddle.

Fig. 3 is a section on the line 3—3 of Fig. 1.

The saddle is composed of two parts, each formed from sheet metal or other suitable stock. One part or member 11 of the saddle has the outturned terminal portions 12 and 13, and the other part or member 15 has the outturned terminal portions 16 and 17. The member 11 is provided with inturned flanges 14 along its edges between which the member 15 is disposed, to prevent relative edgewise motion of the members when fitted together. The terminal portions 12 and 17 overlap at one side and the terminal portions 13 and 16 overlap at the opposite side, and the saddle is adapted to be disposed astride the felly of a wheel. If desired, the member 11 may be padded to prevent injury to the paint or finish of the felly.

The terminal portions 12 and 16 project beyond the respective terminal portions 17 and 13, and have apertures 18 in which are secured the terminals of the flexible tread chain or member 19 which extends across the tread of the tire, the saddle and tread member being adapted to be placed around the felly and tire. This may be readily done when the members 11 and 15 are separated, the member 11 being placed astride the felly and the member 15 being fitted in position against the member 11 between the flanges 14 thereof.

In order to hold the members 11 and 15 together, a latch 20 is swivelled in the member 11 between the ends thereof, and the member 15 has a slot 21 through which the latch 20 passes, and said latch has a T-head 22. When the head 22 is turned to one position it may pass through the slot 21 in moving the members 11 and 15 together or separating them, and when the members are brought together and the head 22 is turned at an angle to the slot 21, the members 11 and 15 are held together. The latch 20 has a friction fit with the member 11 to prevent accidental turning of the latch, but same may be conveniently turned by a wrench or other suitable implement. By having the member 15 fitted between the flanges 14 of the member 11, a single latch or securing element is sufficient to hold the members together against accidental separation or relative displacement with respect to one another.

Having thus described the invention, what is claimed as new is:—

A saddle for a non-skid device adapted to fit astride a wheel felly and composed of two similarly shaped members in reversed positions and overlapping one another, each member having an intermediate portion to extend across the inner periphery of the felly and having outturned terminal portions to be disposed at opposite sides of the felly, one member having flanges along its edges to overlap the edges of the other member, one terminal portion of each member projecting beyond the corresponding terminal portion of the other member and having means for the connection of a flexible tread member, and means carried by one of said members to engage the other member for holding them together.

In testimony whereof I hereunto affix my signature.

MATHEW J. FRAMBACH.